United States Patent [19]

Takahashi et al.

[11] Patent Number: 5,248,751
[45] Date of Patent: Sep. 28, 1993

[54] CURABLE ORGANOPOLYSILOXANE COMPOSITIONS

[75] Inventors: Toshiaki Takahashi, Arlington, Mass.; Hironao Fujiki, Takasaki, Japan

[73] Assignee: Shin-Etsu Chemical Co., Ltd., Tokyo, Japan

[21] Appl. No.: 866,218

[22] Filed: Apr. 9, 1992

[30] Foreign Application Priority Data

Apr. 9, 1991 [JP] Japan .................. 3-103970

[51] Int. Cl.$^5$ .............................. C08G 77/06
[52] U.S. Cl. ................... 528/15; 524/265; 524/266; 524/730
[58] Field of Search ............ 528/15; 524/265, 266, 524/730

[56] References Cited

U.S. PATENT DOCUMENTS 5,100,976  3/1992  Hamada et al. .................. 528/15

FOREIGN PATENT DOCUMENTS 58-26376  6/1983  Japan .
59-5219   3/1984  Japan .
53-13508  5/1988  Japan .

Primary Examiner—Melvyn I. Marquis
Attorney, Agent, or Firm—Birch, Stewart, Kolasch & Birch

[57] ABSTRACT

A curable organopolysiloxane composition comprising (A) an organopolysiloxane having at least two alkenyl groups and a viscosity of 100 to 200,000 cs, (B) a specific organopolysiloxane having an alkoxysilyl group, (C) an organohydrogen polysiloxane having at least two hydrogen atoms attached to silicon atoms, and (D) an addition reaction catalyst is improved in adhesion. It cures to substrates of metals, glass, rubber and plastics to form a firm bond even in low temperature or brief high temperature curing conditions.

10 Claims, 1 Drawing Sheet

CURABLE ORGANOPOLYSILOXANE COMPOSITIONS

This invention relates to a curable organopolysiloxane composition which cures through crosslinking reaction to rubbery or gel cured products having improved adhesion and tack.

BACKGROUND OF THE INVENTION

It is well known in the art to prepare elastomers through addition reaction between organopolysiloxanes having a vinyl group attached to a silicon atom and organohydrogenpolysiloxanes having a hydrogen atom attached to a silicon atom in the presence of platinum catalysts. A variety of compositions were proposed in conjunction with this reaction. Cured products of these compositions, however, are difficult to firmly adhere to substrates of metals, glass, rubber and plastics. Undesirably, cured silicone rubber can peel off particularly when used in coating, sealing and potting of electronic parts.

For obviating this drawback, a variety of adhesion modifiers were developed as proposed in Japanese Patent Publication (JP.B) Nos. 13508/1978, 26376/1983, and 5219/1984. Although silicone compositions can be substantially improved in adhesion by adding such adhesion modifiers, their adhesion available with low-temperature curing or high-temperature brief curing is still insufficient.

Some of the above-mentioned silicone compositions are used as transparent adhesives free of fillers such as silica for the purpose of taking advantage of the self-adhesiveness and colorless clarity of the silicone base polymer. The addition of an adhesive modifier to these compositions can lead to a partial loss of clarity because the adhesive modifier is not well compatible with the silicone base polymer.

There is a need for an organopolysiloxane composition capable of forming an elastomer of quality having improved adhesion and tack.

SUMMARY OF THE INVENTION

Therefore, an object of the present invention is to provide a curable organopolysiloxane composition which is improved in adhesion and tack even when cured at low temperatures or briefly at high temperatures. Another object of the present invention is to provide a curable organopolysiloxane composition which cures to a highly transparent product when used as a transparent adhesive. A further object of the present invention is to provide a cured product of such a curable organopolysiloxane composition.

The inventors have found that by adding a specific organopolysiloxane having an alkoxysilyl group in a molecule to a curable organopolysiloxane composition of the addition reaction type comprising an organopolysiloxane, an organohydrogenpolysiloxane, and an addition reaction catalyst, the resulting composition is improved in adhesive and bonding forces without adding an adhesive modifier. The composition is improved in adhesion and tack even when cured at low temperatures or briefly at high temperatures. The composition cures to a highly transparent product when used as a self-adhesive transparent adhesive.

According to the present invention, there is provided a curable organopolysiloxane composition comprising, in admixture, (A) an organopolysiloxane having at least two alkenyl groups in a molecule and a viscosity of 100 to 200,000 centistokes at 25° C., (B) an organopolysiloxane having the general compositional formula (I):

$$(A)_a(D)_b(E)_c(G)_d(J)_e(L)_f(M)_g \quad (I)$$

wherein
$A = [(R^1O)_h R^2_{3-h} Si(CH_2)_n]_i R^2_{3-i} SiO_{\frac{1}{2}}$,
$D = [CH_2=CH(CH_2)_{n-2}]_i R^2_{3-i} SiO_{\frac{1}{2}}$,
$E = (R^1O)_3 SiO_{\frac{1}{2}}$,
$G = R^1_3 SiO_{\frac{1}{2}}$,
$J = HO_{\frac{1}{2}}$,
$L = R^1O_{\frac{1}{2}}$,
$M = SiO_{4/2}$,
$R^1$ is a monovalent saturated hydrocarbon group having 1 to 10 carbon atoms,
$R^2$ is a monovalent saturated hydrocarbon group having 1 to 10 carbon atoms or aryl group,
letters a, b, c, d, e, f, and g are numbers meeting
$a > 0$, $b > 0$, $c \geq 0$, $d \geq 0$, $e \geq 0$, $f \geq 0$, $g > 0$,
$a+b+c+d+e+f+g = 1$, and
$0.4 \leq (a+b+c+d+e+f)/g \leq 4$,
h and i each are an integer of from 1 to 3, and
n is an integer of at least 2.

(C) an organohydrogenpolysiloxane having at least two hydrogen atoms attached to silicon atoms in a molecule, and (D) an addition reaction catalyst.

Also contemplated herein is a cured product obtained by curing the curable organopolysiloxane composition.

DETAILED DESCRIPTION OF THE INVENTION

Figure 1:
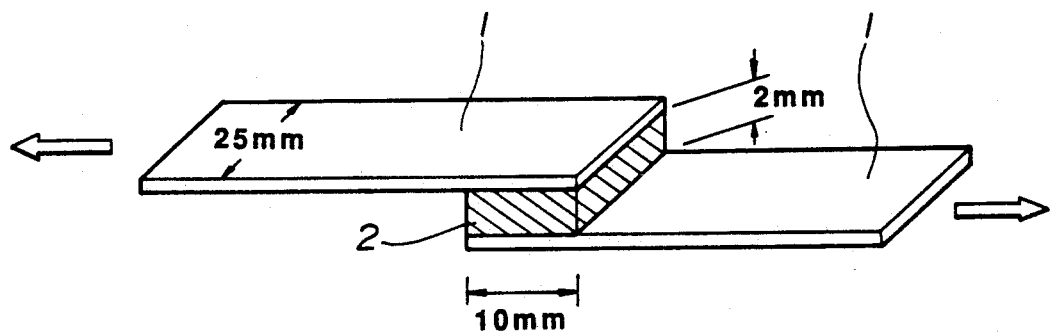
FIG. 1 is a schematic perspective view of a specimen used in an adhesive force test.

The base component of the present composition is (A) an organopolysiloxane having at least two alkenyl groups in a molecule and a viscosity of 100 to 200,000 cs (centistokes) at 25° C. The alkenyl groups include those having 2 to 8 carbon atoms, for example, vinyl, allyl, methacryl and hexenyl groups. The organopolysiloxane may additionally contain organic groups other than the alkenyl group, often substituted or unsubstitued monovalent hydrocarbon groups having 1 to 10 carbon atoms, preferably 1 to 8 carbon atoms, for example, alkyl groups such as methyl, ethyl, propyl, butyl, hexyl and cyclohexyl groups; aryl groups such as phenyl and tolyl groups; aralkyl groups such as benzyl and β-phenylethyl groups; and substituted ones of these groups in which some or all of the hydrogen atoms are replaced by halogen atoms or the like, such as chloromethyl and 3,3,3-trifluoropropyl groups.

Illustrative, non-limiting examples of the organopolysiloxane are given below.

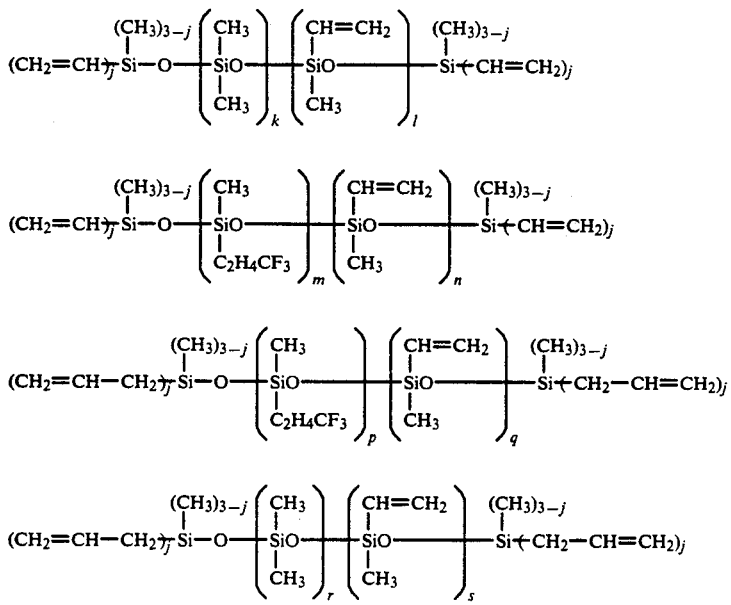

In the formulae, j is equal to 1, 2 or 3, k, m, p and r are positive integers, and l, n, q and s are equal to 0 or positive integers.

The organopolysiloxane may be a linear, branched or cyclic one and a mixture thereof. Preferred are linear organopolysiloxanes as exemplified above. The alkenyl groups may be present at either or both of the end and intermediate of the organopolysiloxane molecular chain although the presence of alkenyl groups at the molecular end is advantageous for imparting mechanical strength to the cured composition.

Component (B) is a characteristic component according to the present invention. It is an organopolysiloxane having the general compositional formula (I).

The units have the following meanings.
$A = [(R^1O)_hR^2{}_{3-h}Si(CH_2)_n]_iR^2{}_{3-i}SiO_{\frac{1}{2}}$,
$D = [CH_2=CH(CH_2)_{n-2}]_iR^2{}_{3-i}SiO_{\frac{1}{2}}$
$E = (R^1O)_3SiO_{\frac{1}{2}}$
$G 32 R^1{}_3SiO_{\frac{1}{2}}$
$J = HO_{\frac{1}{2}}$
$L = R^1O_{\frac{1}{2}}$
$M = SiO_{4/2}$ $R^1$ is a monovalent saturated hydrocarbon group having 1 to 10 carbon atoms or aryl group, $R^2$ is a monovalent saturated hydrocarbon group having 1 to 10 carbon atoms or aryl group, letters a, b, c, d, e, f, and g are numbers meeting
$a > 0$, $b > 0$, $c \geq 0$, $d \geq 0$, $e \geq 0$, $f \geq 0$, $g > 0$,
$a + b + c + d + e + f + g = 1$, and
$0.4 \leq (a+b+c+d+e+f)/g \leq 4$, h and i each are an integer of from 1 to 3, and n is an integer of at least 2.

This organopolysiloxane of formula (I) is of a three dimensional structure having M units, that is, $SiO_{4/2}$ units as basic units and contains an alkoxysilyl group ($(R^1O)Si$ group in unit A) in a molecule. It is an essential component for causing the composition to provide enhanced adhesion to a substrate in contact therewith during curing.

In formula (I), substituents $R^1$ may be the same or different and are independently selected from monovalent saturated hydrocarbon groups having 1 to 10 carbon atoms, for example, alkyl groups such as methyl, ethyl, propyl, butyl, hexyl, and cyclohexyl groups. Methyl and ethyl are preferred for $R^1$ because of ease of synthesis. Substituents $R^2$ may be the same or different and are independently selected from monovalent saturated hydrocarbon groups having 1 to 10 carbon atoms and aryl groups, for example, alkyl groups such as methyl, ethyl, propyl, butyl, hexyl, and cyclohexyl groups and aryl groups such as phenyl, tolyl, and naphthyl groups. Methyl is preferred for $R_2$ because of ease of synthesis.

In formula (I), letter a representative of the proportion of A units, that is, $[(R^1O)_hR^2{}_{3-h}Si(CH_2)_n]_iR^2{}_{3-i}SiO_{\frac{1}{2}}$ units is a positive number. The ratio of A units to $SiO_2$ units, a/g, is preferably 0.1 or higher, especially 0.2 or higher. If a/g is less than 0.1, substantial adhesion enhancement would not be achieved. Letter b representative of the proportion of D units, that is, $[CH_2=CH(CH_2)_{n-2}]_iR^2{}_{3-i}SiO_{\frac{1}{2}}$ units is a positive number. The ratio of $[CH_2=CH(CH_2)_{n-2}]$ units to $SiO_{4/2}$ units, bxi/g, is preferably 0.1 or higher. If bxi/g is less than 0.1, a lower proportion of said units would be incorporated in a crosslinking network through bonds with component (C) so that component (B) might ooze out of the surface of cured product, failing to provide sufficient adhesive forces. Preferably, bxi/g is 0.2 or higher.

Since it is preferred that component (B) contains 0.005 to 0.2 mol of $-CH=CH_2$ group per 100 grams, the value of b is selected so as to provide this vinyl content. Letters c, d, e, and f each are equal to 0 or positive numbers Letter g representative of the proportion of $SiC_{4/2}$ units is a positive number. The sum of $a+b+c+d+e+f+g$ is equal to 1. The constitutional unit represented by M in formula (I), that is, $SiO_{4/2}$ unit is a basic constitutional unit of the polyorganosiloxane of formula (I). A too low number of M units means that organopolysilxanes contain more volatile components and they would be difficult to handle. Organopolysiloxanes having a too high number of M units would not be effective to impart adhesion Therefore, the organopolysiloxane of formula (I) should preferably contain up to 100, more preferably 3 to 50M units per molecule While letters a to g are numbers as defined above, (a+b+c+d+e+f)/g ranges from 0.4 to 4. Letters h and i each are an integer of from 1 to 3, with h=3 being preferred for adhesion enhancement. Letter n is an integer of at least 2, preferably from 2 to 8, with n=2 being most preferred for ease of synthesis.

Illustrative, non-limiting examples of component (B) are given below.

$([(CH_3O)_3SiCH_2CH_2](CH_3)_2SiO_{\frac{1}{2}})_2[(CH_2=CH)(CH_3)_2SiO_{\frac{1}{2}}]_2 (SiO_{4/2})_4$ $([(CH_3O)_3SiCH_2CH_2](CH_3)_2SiO_{\frac{1}{2}})_3 [(CH_2=CH)(CH_3)_2SiO_{\frac{1}{2}}]_2 [(CH_3)_3SiO_{\frac{1}{2}}]_3 (SiO_{4/2})_8$ $([(CH_3O)_3SiCH_2CH_2](CH_3)_2SiO_{\frac{1}{2}})_{16} [(CH_2=CH)(CH_3)_2SiO_{\frac{1}{2}}]_4 [(CH_3)_3SiO_{4/2}]_{12} [(SiO_{4/2})_2$ $([(CH_3O)_3SiCH_2CH_2](CH_3)_2SiO_{\frac{1}{2}})_{12} [(CH_2=CH)(CH_3)_2SiO_{1/2}]_4[(CH_3O)_3SiO_{1/2}]_4[(CH_3)_3SiO_{1/2}]_{12} (SiO_{4/2})_2$ $([(CH_3O)_3SiCH_2CH_2](CH_3)_2SiO_{1/2})_{10}[(CH_2=CH)(CH_3)_2SiO_{1/2}]_4[(CH_3O)_3SiO_{1/2}]_4[(CH_3)_3SiO_{1/2}]_4$.
$(HO_{1/2})_4(CH_3O_{1/2})_4(SiO_{4/2})_{27}$ Preferably, about 2 to 50 parts by weight of component (B) is blended per 100 parts by weight of component (A). Less than 2 parts of component (B) on this basis would not be effective for enhancing adhesion whereas more than 50 parts of component (B) would result in cured products having poor physical properties such as tensile strength and elongation. More preferably, 10 to 35 parts by weight of component (B) is blended on this basis.

Component (C), organohydrogenpolysiloxane, is a crosslinking agent for alkenyl group-containing organopolysiloxanes as components (A) and (B). The organohydrogenpolysiloxane (C) should have at least two hydrogen atoms attached to silicon atoms in a molecule. It may be a linear, branched or cyclic one and a mixture thereof Illustrative, non-limiting examples of the organohydrogenpolysiloxane are given below.

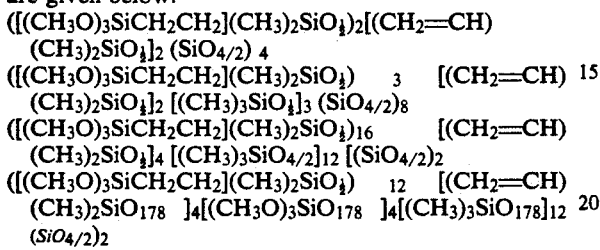

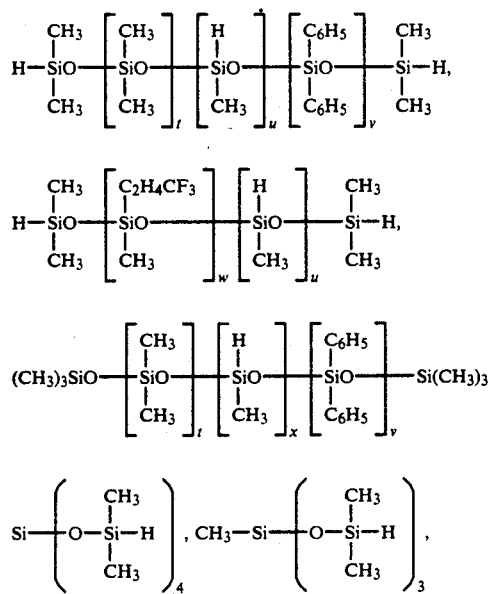

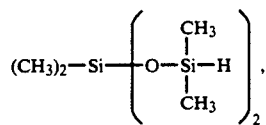

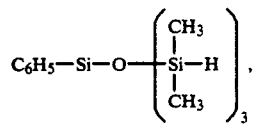

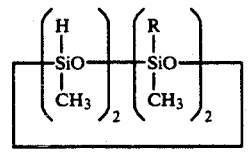

In the formulae, t, u, v, and w are equal to 0 or positive integers, x is an integer of 2 or higher, and R is a hydrogen atom, or methyl, propyl or trimethylsiloxy group.

Component (C) or organohydrogenpolysiloxane is desirably added in such an amount as to provide 0.8 to 20 hydrogen atoms attached to silicon atoms per one of the alkenyl groups present in the organopolysiloxanes as components (A) and (B), more desirably such that the ratio of the Si—H group in the organohydrogenpolysiloxane to the alkenyl group in the organopolysiloxanes may range from 1.2 to 10.

Component (D) is an addition reaction catalyst which serves as a curing promoter for the present composition. The catalyst is often platinum or a platinum compound as commonly used in conventional silicone rubber compositions of the addition curing type. The platinum and platinum compounds used herein include platinum black, solid platinum on alumina, silica, and other supports, chloroplatinic acid, alcohol-modified chloroplatinic acid, complexes of chloroplatinic acid and olefins, and complexes of platinum and vinylsiloxanes. On use, it is preferred for dispersion to finely divide the catalyst or to use a particulate support having a reduced particle size and an increased specific surface area if the catalyst is solid. If the catalyst is chloroplatinic acid or a complex of chloroplatinic acid and an olefin, it may be dissolved in alcohol, ketone, ether, and hydrocarbon solvents.

The addition reaction catalyst is used in a catalytic amount. The amount of platinum or platinum compound added may be adjusted so as to achieve the desired curing rate. The catalytic amount which meets the economy and ensures satisfactory cured products is in the range of 1 to 100 parts of platinum per million parts by weight of the organopolysiloxane components (A), (B) and (C) combined for chloroplatinic acid and similar catalysts which are compatible with siloxane components, and 20 to 500 parts of platinum per million parts by weight of the organopolysiloxane components (A), (B) and (C) combined for platinum black and other solid catalysts.

If desired, (E) a filler may be blended in the present composition. The fillers used herein are not particularly limited and those fillers commonly used in addition type silicone rubber compositions may be used. Examples of the filler include fumed silica, precipitated silica, hydrophobic silica, carbon black, titanium dioxide, ferric oxide, aluminum oxide, zinc oxide, quartz powder, diatomaceous earth, calcium silicate, talc, bentonite, asbestos, glass fibers, and organic fibers, and mixtures thereof.

The fillers may be blended in any desired amount insofar as the objects of the invention are not impaired. Preferably up to about 600 parts by weight of the filler is blended per 100 parts by weight of organopolysiloxane (A). Inter alia, up to about 25 parts by weight of fumed silica and about 300 to 500 parts by weight of alumina, both on the same basis, are preferred. The optimum amount of the remaining fillers may be determined in accordance with their oil absorption, surface area, specific gravity and other factors.

In addition to components (A) to (E), the composition of the invention may contain any other additive in accordance with its intended application. Such optional additives include agents for improving the thermal shock resistance and flexibility of cured products such as nonfunctional organosiloxanes; pigments or heat resistance modifiers such as red iron oxide, black iron oxide, and cerium oxide; flame retardants such as carbon black, titanium oxide, benzotriazole, zinc carbonate, and manganese carbonate; addition reaction retarders such as vinyl group-containing siloxanes and acetylenic compounds; and foaming agents.

Other optional additives are adhesive modifiers used in addition reaction type compositions, for example, alkoxy group-containing hydrogensiloxanes, epoxy group-containing hydrogensiloxanes, and triallyl isocyanurate derivatives. They may be blended in any desired amount insofar as the objects of the invention are not impaired.

The composition of the invention is cured in the same manner as are prior art addition reaction type organopoly. siloxane compositions, for example, by allowing it to stand at 25° C. for 3 to 10 days after mixing the components. Often, the composition is heated to promote curing. For example, the composition is cured by heating to a temperature of 60° C. for about 1 to 4 hours or a temperature of 120° C. for about 10 to 60 minutes. The curing atmosphere may be air or partially or completely sealed.

The curable organopolysiloxane composition of the invention is improved in adhesion and tack. It offers products having improved adhesion and tack even when it is cured at low temperatures or briefly cured at high temperatures. Cured products have acceptable strength without reinforcing fillers. Cured products are transparent when the composition is formulated as a transparent adhesive. Therefore, the composition is applicable in bonding of metals, glass, rubber and plastics, especially in coating, sealing and potting of electronic parts.

EXAMPLE

First described is the synthesis of polyorganosiloxanes of formula (I) used in Examples and a similar, but conventional polyorganosiloxane used in Comparative Examples.

Synthesis 1

To 93.2 grams (0.50 mol) of 1,3-divinyl-1,1,3,3-tetramethyldisiloxane and 81.2 grams (0.50 mol) of hexamethyldisiloxane were added 300 grams (2 mol as $SiO_2$ units) of Ethyl Silicate 40 (manufactured by Tama Chemical Industry K.K., $SiO_2$ value 40%) and 10 grams of p-toluene. sulfonic acid. The mixture was cooled at 0° to 15° C. With stirring, 40 grams of water was added dropwise to the mixture over one hour. After one hour from the end of water addition, 70 grams of water was poured. The mixture was heated under reflux at 80° C. for 5 hours with stirring and thereafter, neutralized with sodium bicarbonate. The ethanol solvent of the resulting solution was replaced by xylene and the solution was filtered, yielding a 40% xylene solution of an organopolysiloxane. This solution contained 248 grams of the organopolysiloxane.

Next, 1.0 grams of a 50% potassium hydroxide aqueous solution was added to the organopolysiloxane solution. The mixture was refluxed at 135° C. for 10 hours, cooled down to 50° C., combined with 4.8 grams (0.044 mol) of trimethyl. chlorosilane, and agitated at 45°–55° C. for 5 hours. The reaction solution was washed several times with 5% sodium sulfate aqueous solution for removing the excess acid. Xylene was distilled off under atmospheric pressure until the organopolysiloxane content of the xylene solution reached 50% by weight. The solution was allowed to cool and then filtered. The resulting xylene solution contained 247 grams of an organopolysiloxane. On analysis, the organopolysiloxane was identified to have a molar ratio of $[(CH_2\!=\!CH)(CH_3)_2SiO_{\frac{1}{2}}]\!:\![(CH_3)_3SiO_{\frac{1}{2}}]\!:\![SiO_{4/2}]$ units of 0.495:0.520:1.000 and contain 0.001 mol of SiOH group and a trace amount of $SiOC_2H_5$ group per 100 grams of the resin value. This organopolysiloxane is designated (S-1).

Synthesis 2

To 200 grams of the 50% xylene solution of organopolysiloxane (S-1) obtained in Synthesis 1 were added 100 grams of xylene and 0.02 grams of a 2% octyl alcohol solution of chloroplatinic acid. While the mixture was maintained at a temperature of 70°14 85° C., 37 grams (0.30 mol) of trimethoxysilane was added dropwise to the mixture over one hour with stirring. After the completion of addition, the mixture was stirred for a further one hour while maintaining it at a temperature of 80°–85° C. Then, while dry nitrogen gas was blown at a rate of 600 ml/min., the reaction solution was heated up to a temperature of 130° C. over two hours for distilling off the excess trimethoxysilane along with part of the xylene solvent. At the end of distillation, the solution was cooled down to room temperature, combined with 0.5 grams of activated carbon, stirred for 5 hours, and filtered for removing the platinum compound. The resulting xylene solution contained 133 grams of an organopolysiloxane. On analysis, the organopolysiloxane was identified to have a molar ratio of $[\{(CH_3O)_3SiCH_2CH_2\}CH_3)_2SiO_{178}]$:
$(CH_2\!=\!CH)(CH_3)_2SiO_{\frac{1}{2}}]$: $[(CH_3SiO_{178}]$: $[SiO_{4/2}]$ units of 0.375:0.121:0.516: 1.000 and contain 0.001 mol of SiOH group and a trace amount of $SiOC_2H_5$ group per 100 grams of the resin value. This organopolysiloxane is designated (S -2).

Synthesis 3

An organopolysiloxane was synthesized by the same procedure as in Synthesis 2 except that 21 grams (0.17 mol) of trimethoxysilane was used. On analysis, the organopolysiloxane was identified to have a molar ratio of $[\{(CH_3O)_3SiCh_2Ch_2\}(CH_3)_2SiO_{178}]\!:\![(CH_2\!=\!CH)(CH_3)_2SiO_{178}]\!:\,(CH_3)_3SiO_{\frac{1}{2}}]\!:\![SiO_{4/2}]$ units of 0.249:0.246:0.517: 1.000 and contain 0.001 mol of SiOH group and a trace amount of $SiOC_2H_5$ group per 100 grams of the resin value. This organopolysiloxane is designated (S-3).

Examples of the present invention are given below by way of illustration and not by way of limitation. Parts and percents are by weight.

EXAMPLE 1

To 100 parts of a linear polydimethylsiloxane blocked with a dimethylvinylsilyl group at either end and having a viscosity of 5,000 cs was added 10 parts of organopolysiloxane (S-2) of Synthesis 2. The mixture was heated in vacuum for removing the xylene. To the mixture were added 25 parts of hydrophobic silica having a BET specific surface area of 170 m²/g, 0.05 parts of a 2% isopropyl alcohol solution of chloroplatinic acid, and 0.2 parts of 1,3,5,7-tetramethyl-1,3,5,7.tetravinylcyclotetrasiloxane. The mixture was thoroughly blended, combined with 3.0 parts of a crosslinking agent of the following formula (1), and thoroughly blended again, yielding an organopolysiloxane composition I.

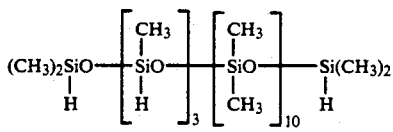
(1)

COMPARATIVE EXAMPLE 1

An organopolysiloxane composition A was prepared as in Example 1 except that organopolysiloxane (S-2) was replaced by organopolysiloxane (S-1) of Synthesis 1.

EXAMPLE 2

An organopolysiloxane composition II was prepared as in Example 1 except that 2.0 parts of an adhesion modifier of the following formula (2) was further added.

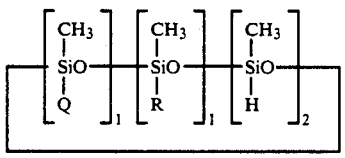
(2)

In formula (2), Q is —CH$_2$CH$_2$Si(OCH$_3$)$_3$ and R is

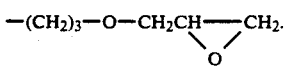

COMPARATIVE EXAMPLE 2

An organopolysiloxane composition B was prepared as in Comparative Example 1 except that 2.0 parts of the adhesion modifier of formula (2) was further added.

Organopolysiloxane compositions I, II and A, B of Examples 1, 2 and Comparative Examples 1, 2, respectively were examined for adhesive force by the following method. The results are shown in Table 1.

ADHESIVE FORCE TEST

Plates of aluminum and glass were used. As shown in FIG. 1, a pair of plates 1 and 1 of 25 mm wide were bonded in a staggered manner through a cured layer 2 of the organopolysiloxane composition. With one plate fixedly secured, the other plate at the free end was pulled at a rate of 50 mm/min. in the arrow direction for measuring a shear adhesive force. The organopolysiloxane composition was cured under three sets of condition, 25° C. for 7 days, 120° C. for 15 minutes, and 120° C. for 60 minutes.

TABLE 1

| | | Adhesive force, kgf/cm² | | | |
|---|---|---|---|---|---|
| | | E1 | E2 | CE1 | CE2 |
| Organopolysiloxane composition | | I | II | A | B |
| Curing conditions | Adherend | | | | |
| 25° C./7 days | Aluminum | 12 | 12 | 2 | 8 |
| | Glass | 14 | 14 | 3 | 9 |
| 120° C./15 min. | Aluminum | 14 | 15 | 2 | 11 |
| | Glass | 16 | 18 | 2 | 13 |
| 120° C./60 min. | Aluminum | 14 | 18 | 2 | 16 |
| | Glass | 17 | 19 | 2 | 18 |

EXAMPLE 3

To 100 parts of a linear polydimethylsiloxane blocked with a dimethylvinylsilyl group at either end and having a viscosity of 5,000 cs was added 15 parts of organopolysiloxane (S-2) of Synthesis 2. The mixture was heated in vacuum for removing the xylene. To the mixture were added 0.05 parts of a 2% isopropyl alcohol solution of chloroplatinic acid and 0.2 parts of 1,3,5,7.tetramethyl-1,3,5,7-tetravinylcyclotetrasiloxane. The mixture was thoroughly blended, combined with 10.0 parts of a crosslinking agent of the following formula (3), and thoroughly blended again, yielding an organopolysiloxane composition III.

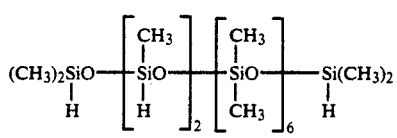
(3)

EXAMPLE 4

An organopolysiloxane composition IV was prepared as in Example 3 except that organopolysiloxane (S.2) was replaced by 15 parts of organopolysiloxane (S.3) of Synthesis 3.

COMPARATIVE EXAMPLE 3

An organopolysiloxane composition C was prepared as in Example 3 except that organopolysiloxane (S-2) was replaced by 15 parts of organopolysiloxane (S-1) of Synthesis 1.

COMPARATIVE EXAMPLE 4

An organopolysiloxane composition D was prepared as in Comparative Example 3 except that 2.0 parts of the adhesion modifier of formula (2) (see Example 2) was further added.

Organopolysiloxane compositions III, IV and C, D of Examples 3, 4 and Comparative Examples 3, 4, respectively were examined by the following tests. The results are shown in Table 2.

Adhesive Force

The adhesive force of an organopolysiloxane composition to glass was examined by the same adhesive force test as previously described. The organopolysiloxane composition was cured at 120° C. for 60 minutes.

Physical Properties

An organopolysiloxane composition was cured into a sheet of 2 mm thick, which was measured for specific gravity, hardness (JIS A scale), elongation, and tensile strength according to JIS K6301.

Light Transmittance

An organopolysiloxane composition was cured in a glass cell with a light path length of 10 mm for visible light absorption measurement. The light transmittance of the cured sample was measured at a wavelength of 500 nm. The reference used was water.

TABLE 2

| Organopolysiloxane composition | E3 III | E4 IV | CE3 C | CE4 D |
|---|---|---|---|---|
| Adhesive force to glass, kgf/cm² | 15 | 13 | 4 | 14 |
| JIS K6301 physical properties | | | | |
| Specific gravity | 1.04 | 1.04 | 1.04 | 1.04 |
| Hardness (scale A) | 14 | 16 | 18 | 17 |
| Elongation, % | 180 | 160 | 150 | 160 |
| Tensile strength, kgf/cm² | 22 | 24 | 25 | 23 |
| Light transmittance, % | 95 | 96 | 97 | 68 |

As seen from Tables 1 and 2, the organopolysiloxane compositions of the present invention (Examples 1–4) provide cured products having improved adhesiveness even subject to low-temperature curing or brief high-temperature curing. The cured products have practically acceptable strength without a need for reinforcing filler and are fully transparent.

Although some preferred embodiments have been described, many modifications and variations may be made thereto in the light of the above teachings. It is therefore to be understood that within the scope of the appended claims, the invention may be practiced otherwise than as specifically described.

We claim:

1. A curable organopolysiloxane composition comprising, in admixture,
    (A) an organopolysiloxane having at least two alkenyl groups in a molecule and a viscosity of 100 to 200,000 centistokes at 25° C.,
    (B) an organopolysiloxane having the general compositional formula (I):

$$(A)_a(D)_b(E)_c(G)_d(J)_e(L)_f(M)_g \quad (I)$$

wherein
    $A = [(R^1O)_h R^2_{3-h}Si(CH_2)_n]_i R^2_{3-i}SiO_{\frac{1}{2}}$,
    $D = [CH_2=CH(CH_2)_{n-2}]_i R^2_{3-i}SiO_{\frac{1}{2}}$,
    $E = (R^1O)_3 SiO_{\frac{1}{2}}$,
    $G = R^1_3 SiO_{\frac{1}{2}}$,
    $J = HO_{\frac{1}{2}}$,
    $L = R^1O_{\frac{1}{2}}$,
    $M = SiO_{4/2}$,
    $R^1$ is a monovalent saturated hydrocarbon group having 1 to 10 carbon atoms,
    $R^2$ is a monovalent saturated hydrocarbon group having 1 to 10 carbon atoms or aryl group,
    letters a, b, c, d, e, f, and g are numbers meeting
    $a > 0$, $b > 0$, $c \geq 0$, $d \geq 0$, $e \geq 0$, $f \geq 0$, $g > 0$,
    $a + b + c + d + e + f + g = 1$, and
    $0.4 \leq (a+b+c+d+e+f)/g \leq 4$,
    h and i each are an integer of from 1 to 3, and
    n is an integer of at least 2,
    (C) an organohydrogenpolysiloxane having at least two hydrogen atoms attached to silicon atoms in a molecule, and
    (D) an addition reaction catalyst selected from the group consisting of platinum and a platinum compound.

2. The composition of claim 1 whrein component (B) contains 0.005 to 0.02 mol of —CH=CH₂ group per 100 grams.

3. The composition of claim 1 wherein about 2 to about 50 parts by weight of component (B) is blended per 100 parts by weight of component (A).

4. The composition of claim 1 wherein component (C) is added in an amount to provide 0.8 to 20 hydrogen atoms attached to silicon atoms per one of the alkenyl groups in components (A) and (B).

5. The composition of claim 1 which further comprises (E) a filler.

6. A cured product obtained by curing a curable organopolysiloxane composition as set forth in any one of claims 1 to 5.

7. The composition of claim 1 wherein component (A) is selected from the group consisting of

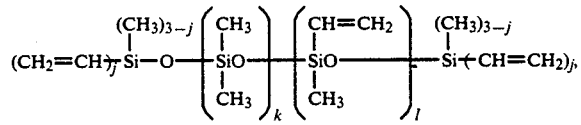

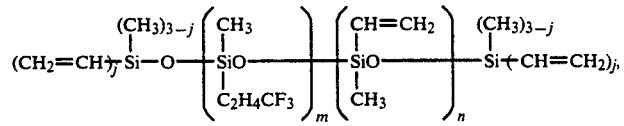

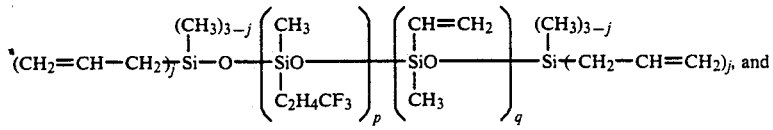

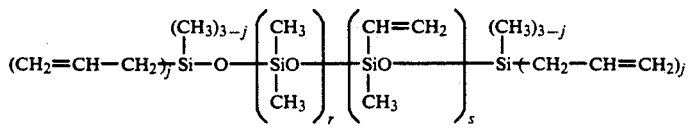

and wherein j=1, 2 or 3; k.m.p and r=positive integers and 1, n,q and s=0 or positive integers.

8. the composition of claim 1 wherein component (B) is selected from the group consisting of
   ① ([(CH$_3$O)$_3$SiCH$_2$CH$_2$](CH$_3$)$_2$SiO$_{\frac{1}{2}}$)$_2$[(CH$_2$=CH) (CH$_3$)$_2$SiO$_{\frac{1}{2}}$]$_2$ (SiO$_{4/2}$) $_4$,
   ② ([(CH$_3$O)$_3$SiCH$_2$CH$_2$](CH$_3$)$_2$SiO$_{\frac{1}{2}}$) $_3$[(CH$_2$=CH) (CH$_3$)$_2$SiO$_{\frac{1}{2}}$]$_2$ [(CH$_3$)$_3$SiO$_{\frac{1}{2}}$]$_3$ (SiO$_{4/2}$)$_8$,
   ③ ([(CH$_3$O)$_3$SiCH$_2$CH$_2$](CH$_3$)$_2$SiO$_{\frac{1}{2}}$)$_{16}$ [(CH$_2$=CH) (CH$_3$)$_2$SiO$_{\frac{1}{2}}$]$_4$ [(CH$_3$)$_3$SiO$_{4/2}$]$_{12}$ [(SiO$_{4/2}$)$_2$,
   ④ ([(CH$_3$O)$_3$SiCH$_2$CH$_2$](CH$_3$)$_2$SiO$_{\frac{1}{2}}$) $_{12}$[(CH$_2$=CH) (CH$_3$)$_2$SiO$_{178}$ ]$_4$[(CH$_3$O)$_3$SiO$_{178}$ ]$_4$[(CH$_3$)$_3$SiO$_{178}$ ]$_{12}$(SiO$_{4/2}$)$_2$, and e,crc/5/ ([CH$_3$O)$_3$SiCH$_2$CH$_2$](CH$_3$)$_2$SiO$_{178}$ )$_{10}$[(CH$_2$=CH) (CH$_3$)$_2$SiO$_{178}$ ]$_4$[(CH$_3$O)$_3$SiO$_{178}$ ]$_4$](CH$_3$)$_3$SiO$_{178}$ ]$_4$(HO$_{178}$ )$_4$(CH$_3$O$_{178}$ )$_4$(SiO$_{4/2}$)$_{27}$.

9. The composition of claim 1 wherein component (c) is selected from the group consisting of

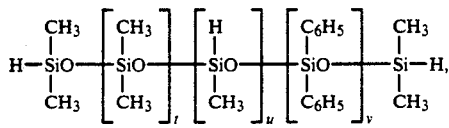

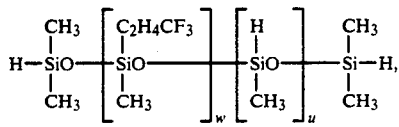

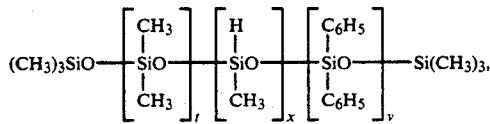

wherein
t, u, v and w=0 or positive integers;
X=an integer 2 or higher;
R=H, methyl, propyl or trimethylsiloxy.

10. The composition of claim 1 wherein said (D) platinum compound is selected from the group consisting of platinum black, solid platinum on alumina, solic platinum on silica, chloroplatinic acid, alcohol-modified chloroplatinic acid, complexes of chloraplatinic acid and olefins and complexes of platinum and vinylsiloxanes.

* * * * *